United States Patent [19]

Fochler

[11] Patent Number: 4,741,593
[45] Date of Patent: May 3, 1988

[54] MULTIPLE CHANNEL DUCT MANIFOLD SYSTEM FOR FIBER OPTIC CABLES

[75] Inventor: Helmut P. Fochler, Chagrin Falls, Ohio

[73] Assignee: TBG Inc., New York, N.Y.

[21] Appl. No.: 830,939

[22] Filed: Feb. 19, 1986

[51] Int. Cl.$^4$ .............................................. G02B 6/44
[52] U.S. Cl. ................... 350/96.23; 138/111; 138/120; 138/121; 174/96
[58] Field of Search .............. 350/96.23; 174/84 R, 174/95, 96, 97; 138/103, 111–117, 120, 121, 122, 155, 173, DIG. 2

[56] References Cited

U.S. PATENT DOCUMENTS

| | | | |
|---|---|---|---|
| 3,699,684 | 10/1972 | Sixt | 138/121 X |
| 4,232,935 | 11/1980 | Rohner et al. | 350/96.23 |
| 4,525,702 | 6/1985 | Kitagawa et al. | 350/96.23 X |
| 4,585,034 | 4/1986 | Hubbard et al. | 138/111 |
| 4,688,890 | 8/1987 | DeMeo et al. | 350/96.23 |

FOREIGN PATENT DOCUMENTS 3228055  2/1984  Fed. Rep. of Germany ...... 138/111

Primary Examiner—John Lee
Attorney, Agent, or Firm—Laney, Dougherty, Hessin & Beavers

[57] ABSTRACT

A multiple channel duct manifold system for optical fibers which includes a plurality of elongated, corrugated tubing sections extended in parallel, contiguous relation to each other, and retained in such contiguous relation by a surrounding overwrap of thin flexible, synthetic resin film.

2 Claims, 1 Drawing Sheet

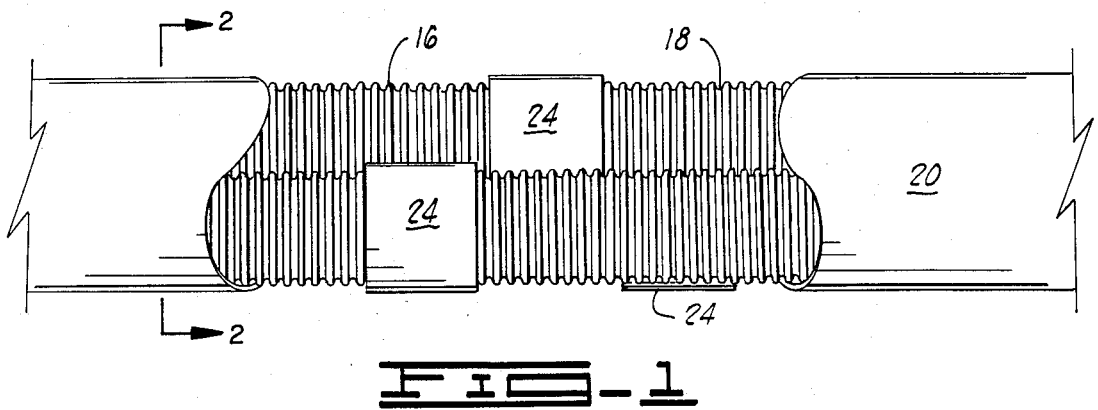
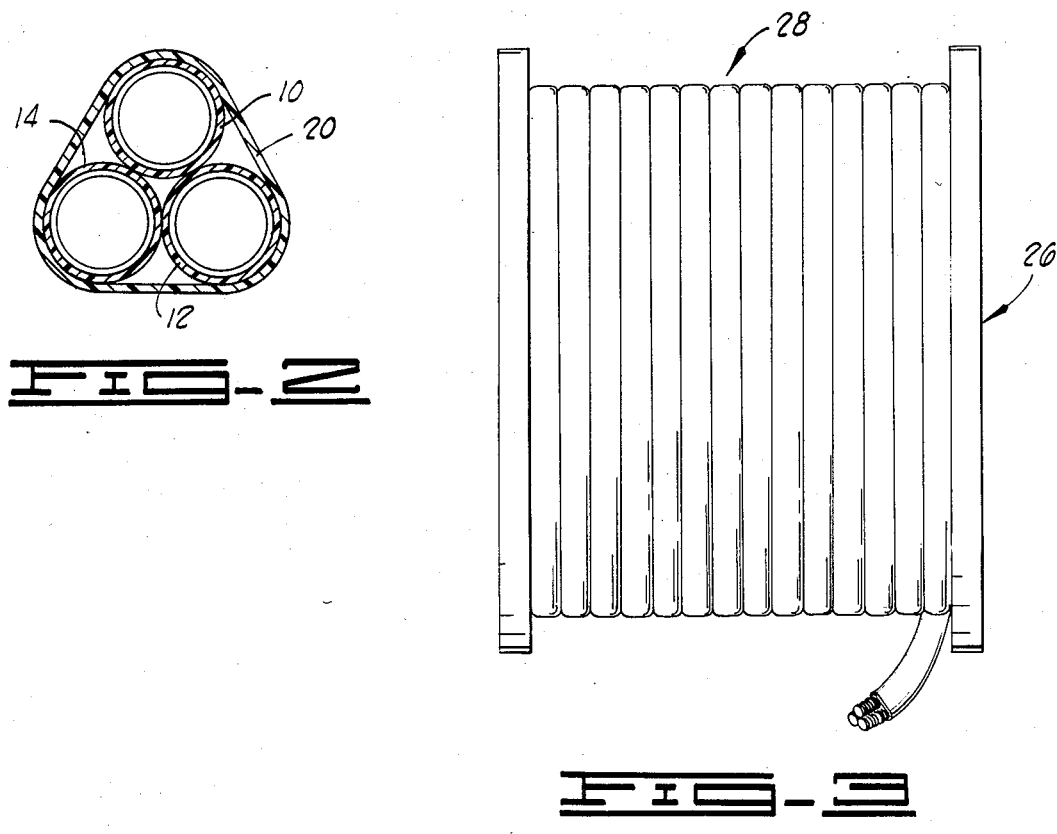

MULTIPLE CHANNEL DUCT MANIFOLD SYSTEM FOR FIBER OPTIC CABLES

FIELD OF THE INVENTION

This invention relates to tubing or duct which is provided for containing long runs of optical fibers disposed in underground communications networks. More particularly, the invention relates to a multiple channel duct manifold system for optical fibers which includes a plurality of contiguous ducts or tubing sections adapted for the containment of lengthy runs of optical fibers, such as are typically employed in a long distance communication system.

BACKGROUND OF THE INVENTION

Brief Description of the Prior Art

The use of light or optical conductors in place of, or in addition to, electrical conductors for the purpose of long distance transmission of information signals has rapidly increased in recent times. Glass fibers or filaments are preferably used as such light conductors, as are some other solid and liquid substances. Very long fiber-like conductors are frequently referred to as optical fiber cables, or as light conducting cables.

Optical fiber usage presents some problems due to the mechanical characteristics of these fibers, such as their low tensile strength and ultimate enlongation. One effort made to reduce or solve these problems entails the encasement of the optical fibers in tubular elements or sheaths of various types (often termed innerducts) which both protects the optical fibers from mechanical damage, and also facilitates their placement in underground systems extending over great distances. Among the sheathing materials which have been employed are thermoplastic synthetic resins such as polyethelene, polyester, polyamides and polyacrylates. It is still necessary, however, to attempt to minimize the magnitude of the stresses and deforming forces which act upon the optical fibers during the construction of cables, including the tubular protective elements, and during the laying of these cables in the earth.

In U.S. Pat. No. 4,153,332 to Longoni, a sheathed optical fiber cable is disclosed and includes a surrounding external sheath of a plastic material which encloses a plurality of tubular elements. Each one of the tubular elements encloses an optical fiber. The tubular elements have smooth walls, both internally and externally. The Longoni patent expalins that the optical fibers which are inserted in the tubular elements or sheaths can be bare, or each can be covered with a thin adhering protective layer of a plastic material.

Franke et al U.S. Pat. No. 4,039,248 describes a fiber-like conductor which is housed within a tubular sheath. The sheath may be corrugated for the purpose of retaining the fiber-like conductor in a desired undulating configuration within the sheath.

Brief Description of the Present Invention

The present invention is a multiple channel duct manifold system for containing optical fiber cables. The multiple channels are made up of a plurality of contiguous, codirectionally extending sections of elongated tubular elements or conduits. The sections of tubing or conduit are corrugated and are highly flexible. The corrugations include contiguous alternating ridges and troughs or grooves extending along the length of the tubing or conduit section.

The several tubing sections are held in contiguous abutting relationship, with their longitudinal axes extending substantially parallel, by a thin, encircling flexible sheath or overwrap of synthetic resin.

The length of the multiple channel duct manifold system can be extended by joining or splicing sections of the corrugated tubing or conduit in end-to-end relationship to each other by the use of a suitable coupling or sleeve which functions to interlock the sections in end-to-end relationship.

An important object of the invention is to provide a tubular system for encasing and carrying elongated runs of optical fibers as they are employed in an underground communication system.

Another object of the invention is to provide a multiple channel duct manifold system in which a plurality of corrugated synthetic resin tubes or conduits are laid in abutting relationship to each other with their axes extending parallel, and are then overwrapped with a film of synthetic resin material which is capable of undergoing bending and flexing with the several corrugated tubing sections, as may be needed to negotiate curves and bends in an underground innerduct system.

A further object of the invention is to provide a mechanically strong, optical fiber tubing encasement system where a plurality of tubular sections are laid one upon the other and harnessed into a bundle by the use of a flexible overwrap element.

Additional objects and advantages will become apparent as the following detailed description of the invention is read in conjunction with the accompanying drawings which illustrate a preferred embodiment of the invention.

GENERAL DESCRIPTION OF THE DRAWINGS

FIG. 1 is a front elevational view of the optical fiber duct manifold system of the invention depicting a typical system containing three optical fiber ducts which are contained within an external synthetic resin sheath. A portion of the external synthetic resin sheath has been broken away to show two of the optical fiber ducts which are here made up of serially or end-to-end coupled duct sections.

FIG. 2 is a sectional view taken along the line 2—2 of FIG. 1.

FIG. 3 is a view in elevation illustrating the manner in which manifolded optical fiber ducts constructed in accordance with the invention are reeled upon a storage reel ready to be paid out for typical installation in an underground location.

DETAILED DESCRIPTION OF A PREFERRED EMBODIMENT OF THE INVENTION

Referring to FIG. 1, the fiber optic multiple channel duct manifold system of the invention includes a plurality of elongated conduit or tubing sections which are manifolded into contiguous relationship to each other. In the illustrated embodiment of the invention, three sections of corrugated conduit, denominated by reference numerals 10, 12 and 14, are utilized. In some applications, many more than three co-extending conduits or tubular elements may be utilized, and are positioned contiguously to each other.

As will be perceived in referring to FIG. 1, each of the corrugated conduit sections 10, 12 and 14 is characterized in having contiguous, circumferentially extending corrugations formed over the entire length of the conduit section. The corrugations are made up of a series of ridges 16 and valleys or troughs 18, and these provide the characteristic internal wall geometry of each of the conduit sections, as well as external wall configuration. Although regular, precisely circular corrugations constitute the preferred corrugation configuration, helical corrugations can also be utilized.

The material of which each corrugated conduit section 10, 12 and 14 is constructed can be any of various synthetic resins including, but not limited to, polyvinylchloride, polyethylene, polypropylene and various polyamides. It is important that the materials selected have relatively good flexibility since, as will be hereinafter explained, an important and advantageous characteristic of the fiber optic multiple channel manifold system of the invention is its ability to be coiled or bent through a relatively small radius without fracture or damage.

A typical utilization of conduits for the purpose of containing optical fibers is for burial in subterranean tunnels or large diameter ducts, or direct burial in the earth as a part of communications systems. In any case, each conduit section extends over substantial distances, and encases or encloses the optical fibers which are to constitute the communication medium. Typically, a section of the corrugated conduit and duct can have a length of from about 20 feet to about 2,000 feet, and a number of sections of the conduit are usually spliced or connected together in end-to-end relation so that the overall length of the newly connected conduit sections may be many miles in length.

For the purpose of retaining the manifolded corrugated conduit or duct sections in contiguous and abutting relationship to each other, a thin flexible film or sheath 20 of synthetic resin is wrapped tightly around the sections of conduit as illustrated in FIG. 1. The sheath or film 20 of overwrapped material is preferably from about 5 mils to about 15 mils in thickness, and has sufficient flexibility and strength that the manifolded optical fiber ducts can be bent through a relatively small radius without fracture or mechanical failure of the film overwrap. The sheath 20 is preferably constructed of rigid polyvinylchloride, but other synthetic resin materials can also be utilized.

At those locations along the manifolded sections of corrugated conduit or duct where the sections terminate, and it is necessary, for tubular continuity and extension of length, to connect sections of the duct or conduit in an end-to-end relation, sleeves or couplings 24 of the type depicted in FIG. 1 are utilized. Various types of such couplings 24 can be employed, including the types used for coupling standard Schedule 40 plastic conduit sections to each other. The coupling or interlock can be achieved mechanically, by glue or adhesion or by thermal fusion. The type of coupling currently marketed under the name ENDOCLIP by Endot Industries of Denville, N.J. can also be employed. Preferably, the sleeves or couplings 24 are relatively thin so that no significant enlargement in the overall outside diameter of the conduit section is caused as a result of connection of the coupling or sleeve thereto. Generally, the coupling or sleeve utilized will be an internally ribbed element which can mechanically interengage the corrugation on the conduit sections, and thus form a positive interlock between adjacent end portions of the duct or conduit sections.

I have found that the duct manifold system of the type described is surprisingly flexible and can be easily coiled around relatively large reels of the type illustrated in FIG. 3 of the drawings, and there denominated by reference numeral 26. A great length of the duct manifold system 28 can be coiled on the reel 26 for lay out into an underground communications pipe, or can be reeled into a trench for direct burial.

An important advantage of the present invention is that the multiple sections of duct or corrugated conduit can be retained in the same relationship to each other at one end of the manifold system as at the other. Thus, it will be possible to know which of the ducts contain certain specific optical fibers connected to certain signal inputs at one end thereof, so that no misconnections occur as a result of confusing the optical fibers in one of the ducts with those in another duct as a result of twisting or turning occurring over the length of the manifold system. By color coding, notching or otherwise marking at least one of the conduit sections in a characteristic way at each end, the relationship and identity of all conduit sections can be known. The manifold system also permits longer pulls to be accomodated than with the single conduit sections, and the corrugated interior wall assures that less surface area will contact the optical fibers inside the conduit sections, and thus less surface friction will be developed. The fibers thus can be pulled through the conduit sections more easily.

The conduit manifold system allows an overall reduction in fiber optic cable installation costs, and the manifolding aspect of the system maintains high structural integrity over the entire length of the conduit sections, and affords enhanced moisture protection to the entire system by reason of the overwrap employed.

Although a preferred embodiment of the invention has been illustrated and described in the foregoing description, it will be understood that various changes can be made in the illustrated and described structure without departure from the basic principles upon which the invention rests. Thus, for example, many more than three duct or conduit sections can be manifolded together over very long lengths. Changes such as that described are nevertheless deemed to be characteristic of other embodiments of the invention which fall within the spirit and scope of the invention as the same is defined by the following claims or reasonable equivalents thereof.

What is claimed is:

1. A multiple channel duct for optical fiber cable comprising:
   a plurality of contiguous, co-directionally extending, substantially parallel sections of elongated, tubular corrugated conduit in abutting contact with each other, each of said sections having a series of encircling contiguous convolutions extending over the length thereof to impart flexibility to the respective elongated conduit sections, said convolutions being made up of contiguous ridges and troughs whereby the frictional resistance to the pulling of optical fibers therethrough is substantially reduced, and the resistance of said sections to longitudinal sliding movement against each other is substantially increased; and
   a flexible, synthetic resin overwrap sheath consisting of a sheath of rigid polyvinylchloride having a thickness of about 5 mils to about 15 mils, said sheath of rigid polyvinylchloride encircling and jacketing the corrugated conduit sections over their entire length to retain them in their contiguous relationship, said sheath having sufficient strength and flexibility to permit said conduit sections to undergo flexing without any substantial restriction of, or reduction in, the extent of flexibility of said sections resulting from encircling them with said sheath, and said sheath maintaining its physical integrity without parting or fracturing as said conduit sections undergo bending through a small radius of curvature.

2. A multiple channel duct as defined in claim 1 wherein said multiple channel duct is further characterized as including a plurality of sets of said sections of conduit in which the conduit sections in the respective set are coupled to each other in co-linear, end-to-end relationship, each of said sets having the longitudinal axes of the conduit sections therein extending parrallel to, and spaced from, the axes of the conduit sections in each other set, and said sections being retained in tangetial abutting contact by said flexible overwrap.

* * * * *